(12) United States Patent
Nicolich

(10) Patent No.: US 11,779,863 B2
(45) Date of Patent: Oct. 10, 2023

(54) SAND FILTER LED STATUS LIGHT

(71) Applicant: Evoqua Water Technologies LLC, Pittsburgh, PA (US)

(72) Inventor: Steven Nicolich, East Greenwhich, RI (US)

(73) Assignee: Evoqua Water Technologies LLC, Pittsburgh, PA (US)

( * ) Notice: Subject to any disclaimer, the term of this patent is extended or adjusted under 35 U.S.C. 154(b) by 0 days.

(21) Appl. No.: 17/875,394

(22) Filed: Jul. 27, 2022

(65) Prior Publication Data

US 2023/0090606 A1  Mar. 23, 2023

Related U.S. Application Data

(63) Continuation of application No. 16/648,424, filed as application No. PCT/US2018/051312 on Sep. 17, 2018, now Pat. No. 11,541,333.

(60) Provisional application No. 62/559,685, filed on Sep. 18, 2017.

(51) Int. Cl.
| | |
|---|---|
| *B01D 24/48* | (2006.01) |
| *B01D 24/02* | (2006.01) |
| *B01D 24/46* | (2006.01) |
| *B01D 35/143* | (2006.01) |
| *C02F 1/00* | (2023.01) |
| *C02F 103/20* | (2006.01) |
| *C02F 103/42* | (2006.01) |

(52) U.S. Cl.
CPC ........ *B01D 24/4884* (2013.01); *B01D 24/02* (2013.01); *B01D 24/4631* (2013.01); *B01D 24/4668* (2013.01); *B01D 35/143* (2013.01); *C02F 1/004* (2013.01); *C02F 1/008* (2013.01); *B01D 2101/04* (2013.01); *C02F 2103/20* (2013.01); *C02F 2103/42* (2013.01); *C02F 2209/005* (2013.01); *C02F 2209/03* (2013.01); *C02F 2303/16* (2013.01)

(58) Field of Classification Search
None
See application file for complete search history.

(56) References Cited

U.S. PATENT DOCUMENTS

| | | | |
|---|---|---|---|
| 3,963,891 A | 6/1976 | de Magondeaux | |
| 6,171,480 B1 | 1/2001 | Lee et al. | |
| 2004/0040902 A1 | 3/2004 | Hill et al. | |
| 2005/0000894 A1* | 1/2005 | Hedstrom | B01D 65/10 |
| | | | 210/791 |
| 2005/0109680 A1 | 5/2005 | Moscaritolo et al. | |

(Continued)

*Primary Examiner* — Richard C Gurtowski

(57) ABSTRACT

A system for treating water for use in aquatics or recreational facilities is disclosed. The system includes a media filter vessel, a pressure sensor, and a monochromatic light source. A method of treating water for use in aquatics or recreational facilities is also disclosed. The method includes fluidly connecting a media filter vessel to a source of water for use in aquatics or recreational facilities, illuminating a media inside the media filter vessel, observing a monochromatic light source display a first indicator and observing a monochromatic light source display a second indicator. A method of retrofitting a media filter vessel is also disclosed. The method includes installing a pressure sensor on the media filter vessel, installing a monochromatic light source and operably connecting the monochromatic light source to a manual control and to the pressure sensor.

10 Claims, 2 Drawing Sheets

(56) References Cited

U.S. PATENT DOCUMENTS

2006/0108267 A1  5/2006  Warren et al.
2013/0068673 A1  3/2013  Maggiore et al.
2014/0290559 A1  10/2014  Jakop

* cited by examiner

SAND FILTER LED STATUS LIGHT

CROSS-REFERENCE TO RELATED APPLICATION

This application claims priority under 35 U.S.C. § 119(e) to U.S. Provisional Application Ser. No. 62/559,685, titled "SAND FILTER LED STATUS LIGHT", filed on Sep. 18, 2017, which is incorporated herein by reference in its entirety for all purposes.

FIELD OF TECHNOLOGY

Aspects and embodiments disclosed herein are generally directed to water treatment systems, and more specifically, to water treatment systems for use in aquatics or recreational facilities and methods of operating same.

SUMMARY

In accordance with one aspect, there is provided a system for treating water for use in aquatics or recreational facilities. The system may comprise a media filter vessel connectable to a source of water for use in aquatics or recreational facilities, a pressure sensor configured to measure a differential pressure across the media filter vessel, and a monochromatic light source operably connected to the pressure sensor. The media filter vessel may comprise a viewing window positioned to allow visibility into the media filter vessel. The monochromatic light source may be configured to display a first color indicator associated with a first pressure differential range and a second color indicator associated with a second pressure differential range. The monochromatic light source may be configured to provide a luminosity sufficient to allow visibility into the media filter vessel through the viewing window.

In some embodiments, the system may further comprise a controller operably connected to the pressure sensor. The controller may be configured to initiate a cleaning process of the media filter vessel at a threshold differential pressure. The threshold differential pressure may be associated with deteriorated operation of the media filter vessel. For example, the threshold differential pressure may be 10 psi.

In accordance with certain embodiments, the first pressure differential range may be associated with clean operation of the media filter vessel and the second pressure differential range may be associated with deteriorated operation of the media filter vessel. The second color indicator may be configured to visibly alert an operator to initiate a cleaning process of the media filter vessel.

In some embodiments, the monochromatic light source may be configured to display a third color indicator. The third color indicator may be associated with a third pressure differential range and the third pressure differential range is associated with deteriorating operation of the media filter vessel. The third color indicator may be configured to visibly alert an operator of an increase in the differential pressure.

In accordance with certain embodiments, the first pressure differential range may be less than 5 psi. The second pressure differential range may be more than 10 psi. The third pressure differential range may be between 5 psi and 10 psi.

The monochromatic light source may be a light-emitting diode.

In accordance with certain embodiments, the monochromatic light source may be configured to display a fourth color indicator. The fourth color indicator may be displayed after completion of the cleaning process of the media filter vessel. In some embodiments, the fourth color indicator may be the same color as the first color indicator.

In accordance with another aspect, there is provided a method of treating water for use in aquatics or recreational facilities. The method may comprise fluidly connecting a media filter vessel to a source of water for use in aquatics or recreational facilities and illuminating a media inside the media filter vessel with light in a first mode. The media filter vessel may comprise a pressure sensor configured to measure a differential pressure across the media filter vessel. The media filter vessel may comprise a monochromatic light source operably connected to the pressure sensor. The monochromatic light source may be configured to display a first color indicator associated with a first pressure differential range and a second color indicator associated with a second pressure differential range. The media may be illuminated with white light from the monochromatic light source. The method may comprise, in a second mode, observing the monochromatic light source display the first color indicator indicating clean operation of the media filter vessel and/or observing the monochromatic light source display the second color indicator indicating deteriorated operation of the media filter vessel.

In some embodiments, illuminating the media in the first mode may comprise illuminating the media with a luminosity sufficient to allow visibility into the media filter vessel.

The method may comprise initiating a cleaning process of the media filter vessel upon observing the monochromatic light source display the second color indicator. The method may further comprise initiating operation of the media filter vessel upon observing the monochromatic light source display the first color indicator after completion of the cleaning process.

In accordance with yet another aspect, there is provided a method of retrofitting a media filter vessel. The method may comprise installing a pressure sensor on a media filter vessel, installing a monochromatic light source in the media filter vessel, operably connecting the monochromatic light source to a manual control, and operably connecting the monochromatic light source to the pressure sensor. The pressure sensor may be configured to measure a differential pressure across the media filter vessel. The monochromatic light source may be operably connected to the manual control such that the monochromatic light source is configured to illuminate a media inside the media filter vessel responsive to operation of the manual control, in a first mode. The monochromatic light source may be operably connected to the pressure sensor such that the monochromatic light source is configured to display a first color indicator associated with a first pressure differential range and a second color indicator associated with a second pressure differential range responsive to the pressure differential measured by the pressure sensor, in a second mode.

In some embodiments, installing the monochromatic light source may comprise installing a monochromatic light source having a luminosity sufficient to allow visibility into the media filter vessel when operating in the first mode. Installing the monochromatic light source may comprise installing a light-emitting diode.

In accordance with certain embodiments, the method may comprise installing the monochromatic light source on a pre-existing opening of the media filter vessel. For instance, the method may comprise installing the monochromatic light source on an air relief connection of the media filter vessel. The method may further comprise installing the monochromatic light source with an air tight seal.

In some embodiments, the method may further comprise installing a controller. The method may comprise operably connecting the controller to the pressure sensor. The controller may be operably connected to the pressure sensor such that the controller may be configured to initiate a cleaning process of the media filter vessel responsive to the pressure sensor measuring a pressure differential within the second pressure differential range. The method may comprise installing the controller such that the controller may be configured to initiate the cleaning process of the media filter vessel responsive to the pressure sensor measuring a pressure differential greater than 10 psi. The method may comprise installing the controller such that the controller may be configured to terminate the cleaning process of the media filter vessel responsive to the pressure sensor measuring a pressure differential within the first pressure differential range. The method may comprise installing the controller such that the controller may be configured to terminate the cleaning process of the media filter vessel responsive to the pressure sensor measuring a pressure differential less than 5 psi.

The disclosure contemplates all combinations of any one or more of the foregoing aspects and/or embodiments, as well as combinations with any one or more of the embodiments set forth in the detailed description and any examples.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
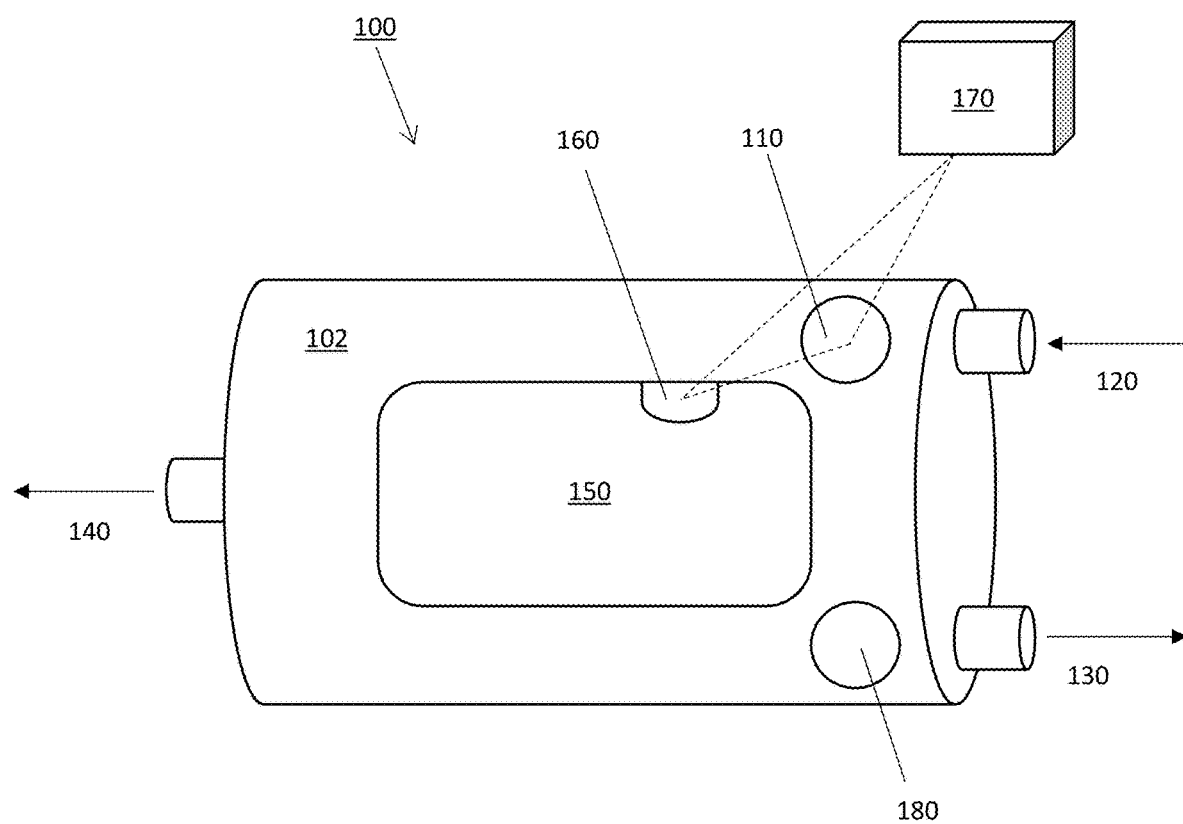
FIG. 1 is a box diagram of a system for treatment of water for use in aquatics and recreational facilities, according to one embodiment.

Systems and methods for treatment of water for use in aquatics and recreational facilities are disclosed herein. The systems and methods may provide filtration of the aquatic and/or recreational water by treatment with a media filter. Media filters typically function as particle removal filters by using a substrate on which a material may be coated. Sand filters, for example, typically use a bed of sand media of a certain depth where particles may become trapped on the surface and also within the bed.

Media filters generally employ a special grade medium to treat water. The special grade medium may be contained in a vessel or other container. The media filter may be a pressure-fed or high-rate media filter. During filtration, the water to be treated may be fed to the media filter vessel, for example, by one or more pumps. Inside the media filter vessel, the water may be distributed by a water distribution head before coming into contact with the special grade medium in the vessel. Generally, the special grade medium acts as a substrate and catches solid contaminants contained in the water. The filtered water is discarded from the vessel and may be returned to the source for further use in the aquatic or recreational facility.

In accordance with certain embodiments, the media filter may be a sand filter. The sand filter may have mono media, dual media, or mixed media within the vessel or container. Typically, the sand may have an effective size between 0.2 mm and 1.0 mm. As disclosed herein, the "effective size" of a medium is the sieve size opening that will allow 10% by weight of a representative sample for the filter material to pass. The sand may have an effective size between 0.3 mm and 0.5 mm. The sand may have an effective size of about 0.2 mm, about 0.3 mm, about 0.4 mm, or about 0.5 mm. The sand may have a uniformity coefficient of less than 2.0. As used herein, the "uniformity coefficient" is the ratio of the sieve size opening from which 60% of the media particles, by weight, will pass divided by the sieve size opening from which 10% of the media particles, by weight, will pass. In some embodiments, the sand may have a uniformity coefficient of less than 2.0, less than 1.75, less than 1.5, less than 1.25, or less than 1.

In accordance with certain embodiments, the media filter may be a regenerative media filter, an activated carbon filter, or a walnut shell filter. The media filter may comprise any suitable media bed for filtering aquatic and/or recreational water. The media filter may comprise perlite or diatomaceous earth (DE) media. In some embodiments, the media filter may be, for example, a Defender® media filter (distributed by Evoqua Water Technologies LLC, Pittsburgh, Pa.). The media filter may comprise a structure coated with the substrate. For example, the media filter may comprise plastic tubes, optionally porous plastic tubes. The plastic tubes may be coated with perlite or DE. In such an embodiment, the plastic porous tubes may be used to prevent the substrate from passing into the filtrate of the media filter. Once coated, the water to be treated may pass through the coating and then through the structure. The coating layer may provide for very fine filtration media, such that the media filter may filter liquids to a small particle size. In some embodiments, the media filter may be configured to filter liquids to less than 10 μm. The media filter may be configured to filter liquids to less than about 10 μm, less than about 5 μm, less than about 3 μm, or less than about 1 μm.

The media filter vessel may generally be connectable, and in use fluidly connected, to a source of the aquatic and/or recreational water. In some embodiments, the aquatic and/or recreational water to be treated may include water for human or veterinary applications. For example, the aquatic or recreational water may be used for swimming. The aquatic and/or recreational water may be associated with a pool, spa, hot tub, water park, water fountain, aquarium, zoo, animal reserve, and the like. Typically, the media filter vessel may be positioned in the vicinity of the source of the aquatic and/or recreational water. In some embodiments, the media filter vessel may be remote from the source of the aquatic and/or recreational water.

The media filter vessel may be of a size suitable for processing between 70 and 2500 gallons per minute (GPM) of water. For example, the media filter vessel may be sized to process about 70 GPM, about 100 GPM, about 250 GPM, about 500 GPM, about 1000 GPM, about 2000 GPM or about 2500 GPM. The media filter may comprise more than one vessel, arranged in series or in parallel. Generally, the size and arrangement of media filter vessels may vary with the size of aquatic or recreational structure to be filtered.

In accordance with one aspect, there is provided a system for treating water for use in aquatics or recreational facilities. The system may comprise a media filter vessel connectable to a source of water for use in aquatics or recreational facilities. The system may comprise one or more pipes, valves, or pumps positioned to distribute the water within the system and optionally to return the treated water to the aquatic or recreational facility after treatment.

In some embodiments, the media filter vessel may comprise a viewing window positioned to allow visibility into the media filter vessel. An operator may inspect the media filter vessel through the viewing window to determine whether the media filter vessel requires maintenance, repairs, and/or cleaning. The viewing window may be, for example, a hatch on the manway opening of the vessel. To inspect the media bed within the media filter vessel an operator may shine a light through the viewing window.

Operators may shine a light through the viewing window to inspect the media bed. Flashlights generally cause the light to reflect off the particles and contaminants contained within the vessel, making viewing difficult. A monochromatic light source may allow improved visibility into the media filter vessel, for example, by reducing the reflection of light. Thus, in some embodiments, the system may further include a monochromatic light source. In general, the monochromatic light source may be configured to provide a luminosity sufficient to allow visibility into the media filter vessel through the viewing window. The monochromatic light source may provide a luminosity sufficient to allow visibility through the suspended media, to an opposite interior surface of the media filter vessel.

In some embodiments, the monochromatic light source may be a light-emitting diode (LED). The monochromatic light source may be a surface mount LED. The monochromatic light source may be fitted with a male national pipe thread (MNPT). The LED may be bi-color or multi-color. For example, the LED may be a red-green-blue LED or a red-yellow-green LED. The LED may also be configured to provide white light.

The monochromatic light source may be positioned within the media filter vessel and arranged to allow visibility to the interior of the vessel through the viewing window. In some embodiments, the monochromatic light source may be a series of LEDs installed throughout the interior of the media filter vessel. The monochromatic light source may generally be installed in the interior of the vessel with an air tight seal to prevent ingress of air or water leakage. The monochromatic light source and its electrical connections may be waterproof. It is envisioned that a vessel can be converted into a media filter vessel comprising a monochromatic light source by installing the monochromatic light source on a pre-existing opening of the media filter vessel. For instance, the monochromatic light source may be installed on an air relief connection of the media filter vessel.

Periodically, the media filter may require cleaning. As contaminants such as dirt and debris build up within a media filter, the pressure difference across the inlet and outlet of the media filter vessel typically increases. Thus, media filters are generally cleaned once the differential pressure reaches a predetermined threshold level. In some embodiments, the system may comprise a pressure sensor configured to measure the differential pressure of a liquid across the media filter vessel. For example, the pressure sensor may be configured to measure differential pressure between a liquid inlet and a liquid outlet of the media filter vessel. Accordingly, the pressure sensor may be a differential pressure sensor. The pressure sensor may be electronic. The pressure sensor may be digital or analog. In some embodiments, the media filter vessel may be cleaned once the differential pressure reaches 5 psi. For example, the media filter vessel may be cleaned once the differential pressure is at least 7 psi, 10 psi, 12 psi, or 15 psi.

A sand filter may be cleaned by backwashing. Backwashing generally involves reversing flow of the water through the sand filter and expelling the water out a backwashing port of the vessel. The backwashing process may be performed continuously or intermittently (for example, in cycles) until the expelled water is substantially clear, the differential pressure has reached a predetermined level, or for a predetermined period of time based on the size of the filter and flow rate of the water. Backwashing may be performed once daily, multiple times a day, or as needed. Backwashing may be performed for a period of time as needed to expel contaminants from the vessel or to reduce the differential pressure to a working range.

A media filter comprising structures, such as a Defender® media filter, may be cleaned by a cleaning process called bumping. Bumping comprises mechanical movement of the vessel's internal structure which forces water into the structure, evacuating the media from the surface of the structure and sending it into suspension. In accordance with some embodiments, bumping is accomplished by mechanical movement of a septum up and down within the water in the filter vessel. The motion serves to expel the media and contaminants from the septum and into suspension. The bumping process generally allows the filter structure to receive a fresh coating layer once the coating particles reattach to the filter structure. In a regenerative media filter, the bumping process may be performed once daily, twice daily, or as needed. The bumping process may be performed for between 5 and 15 minutes, depending on the differential pressure measured across the media filter vessel. In some embodiments, the bumping process can be performed for about 5 minutes, about 10 minutes, about 15 minutes, or about 20 minutes. The bumping process may be performed continuously or intermittently (for example, in cycles) until the differential pressure has reached a predetermined level.

In some embodiments, the system may further comprise a controller operably connected to the pressure sensor. The controller may be a computer or mobile device. The controller may comprise a touch pad or other operating interface. For example, the controller may be operated through a keyboard and/or mouse. The controller may be configured to run software on an operating system known to one of ordinary skill in the art. The controller may be electrically connected to a power source. The controller may be digitally connected to the pressure sensor and/or to the monochromatic light source. The controller may be connected to the pressure sensor and/or to the monochromatic light source through a wireless connection. The controller may further be operably connected to any pump or valve within the system, for example, to enable the controller to initiate or terminate the cleaning process as needed.

The controller may be configured to initiate a cleaning process of the media filter vessel responsive to the differential pressure measured by the pressure sensor. In some embodiments, the controller may be configured to initiate the cleaning process at a threshold differential pressure. The threshold differential pressure may be associated with deteriorated operation of the media filter vessel. For example, the threshold differential pressure may be 5 psi, 7 psi, 10 psi, 12 psi, or 15 psi.

The controller may further be configured to initiate clean operation of the media filter vessel upon completion of the cleaning process. The controller may be configured to initiate operation at a second threshold differential pressure. The second threshold differential pressure may be associated with clean operation of the media filter vessel. For example, the second threshold differential pressure may be 12 psi, 10 psi, 7 psi, 5 psi, 3 psi, 1 psi, or less than 1 psi.

The system may comprise a monochromatic light source operably connected to the pressure sensor. The monochromatic light source may be operably connected to the controller, and optionally operably connected to the pressure sensor through the controller. The monochromatic light source connected to the pressure sensor may be the same monochromatic light source provided for illuminating the interior of the media filter vessel or a separate monochromatic light source. The monochromatic light source may be configured to display a color indicator responsive to the differential pressure measured by the pressure sensor. For example, the monochromatic light source may be configured to display a first color indicator associated with a first pressure differential range and a second color indicator associated with a second pressure differential range. In some embodiments, the first pressure differential range is one which is associated with clean operation of the media filter while the second differential range is one which is associated with deteriorated operation of the media filter.

The first pressure differential range may be a pressure differential less than 15 psi, less than 12 psi, less than 10 psi, less than 7 psi, or less than 5 psi. The second pressure differential range may be a pressure differential greater than 5 psi, greater than 7 psi, greater than 10 psi, greater than 12 psi, or greater than 15 psi.

Thus, the color indicator displayed may be configured to visibly alert an operator of the status of the media filter vessel. Specifically, in the embodiment described above, the first color indicator may be associated with clean operation of the media filter vessel and the second color indicator may be associated with deteriorated operation of the media filter vessel. An operator who observes the first color indicator displayed by the light source may be informed that the media filter is operating properly and forego the cleaning process at that time. An operator who observes the second color indicator displayed by the light source may be alerted to initiate the cleaning process of the media filter vessel.

In some embodiments, the monochromatic light source may further be configured to display a third color indicator. The third color indicator may be associated with a third pressure differential range. For example, the third color indicator may be associated with a third pressure differential range indicative of deteriorating operation of the media filter vessel. The third color indicator may be configured to visibly alert an operator of an increase in the differential pressure. The third color indicator may be configured to visibly alert an operator that a cleaning process should be initiated soon. The third pressure differential range may be between 5 psi and between 10 psi, between 7 psi and 10 psi, between 7 psi and 12 psi, between 5 psi and 12 psi, between 7 psi and 15 psi, or between 10 psi and 15 psi. Generally, the third pressure differential range may be between the first pressure differential range and the second pressure differential range.

In accordance with certain embodiments, the monochromatic light source may be configured to display a fourth color indicator. The fourth color indicator may be displayed after completion of the cleaning process of the media filter vessel. In some embodiments, the fourth color indicator may be the same color as the first color indicator. Alternatively, the fourth color indicator may be different than the first color indicator. The fourth color indicator may be configured to alert an operator that the cleaning process has been completed and the media filter vessel is ready for clean operation. In some embodiments, for example, in embodiments where the controller automatically initiates clean operation of the media filter after completion of the cleaning process, the fourth color indicator may be configured to alert an operator that the media filter vessel is operating once again. The fourth pressure differential range may be less than 12 psi, less than 10 psi, less than 7 psi, less than 5 psi, less than 3 psi, or less than 1 psi. The fourth pressure differential range may be the same or different than the first pressure differential range.

The different color indicators may be a display of color or light which is familiar to the operator. For example, the first color indicator may be green, the second color indicator may be red, and the third color indicator may be yellow. In some embodiments, the fourth color indicator is green. The fourth color indicator may be any other color, for example, orange, blue, purple, etc. It should be appreciated that the color indicators may be or comprise any differentiating visual indicator. For example, the color indicators may be constant light, intermittent blinking light (in various blinking patterns), dimming/increasing light, or no light. The color indicator light patterns may be the same color or different colors. In one exemplary embodiment, the first color indicator may be constant light, the second color indicator may be a rapid blinking light, and the third color indicatory may be a slower blinking light. The fourth color indicator may be constant light or may be a pattern of blinking light. The color indicators may be any combination of colors and light patterns that may alert an operator of the status of the media filter vessel.

In embodiments where the same monochromatic light source is provided to illuminate the media filter vessel for visibility and to display the color indicator, these operations may be performed in first and second modes of operation, respectively. The first mode of operation may be performed to allow viewing into the media filter vessel. In accordance with certain embodiments, the first mode of operation may be manually initiated and terminated by an operator. For example, the first mode of operation may comprise activating the monochromatic light source to illuminate the media by flipping a switch, pressing a button, changing a setting, or activating an application. The first mode of operation may comprise illuminating the media with white light or any other light which may allow adequate visibility through the media. The illuminating light may be configured to allow adequate visibility when the media bed is in suspension.

The second mode of operation may be performed to display the color indicator, informing the operator of the status of the media filter. The second mode of operation may be initiated or terminated by the operator, as described above with respect to the first mode of operation. During operation, the second mode of operation may generally operate and select the color indicator automatically based on the differential pressure measurement made by the pressure sensor.

In some embodiments, the monochromatic light source continuously operates in the second mode of operation. The first mode of operation may be initiated by the operator to override the second mode of operation. Similarly, in accordance with some embodiments, the first mode of operation may be terminated by the operator. Upon termination of the first mode of operation, the second mode of operation may take over or the monochromatic light source may remain off until the operator initiates the first mode of operation or the second mode of operation.

The system may comprise additional sensors optionally connected to the controller. The sensors may include, for example, pH sensors, oxidation-reduction potential (ORP) sensors, chlorine sensors, temperature sensors, etc. The sensors may be placed in the media filter vessel or in the source of the aquatic and/or recreational water. The controller may operate the system responsive to measurements made by the additional sensors.

FIG. 1 is a box diagram of an exemplary system for treatment of water for use in aquatics or recreational facilities. The system 100 may include a media filter vessel 102. The media filter vessel may include a viewing window 150 and a monochromatic light source 160 within the media filter vessel 102 configured to allow visibility of the media in the media filter vessel 102 through the viewing window 150. The system may further include a pressure sensor 110 configured to measure a differential pressure within the media filter vessel 102. For example, the pressure sensor 110 may be configured to measure differential pressure between the influent inlet 120 of the media filter vessel 102 and the effluent outlet 130 of the media filter vessel. The system may further include a controller 170 operably connected to the pressure sensor 110 and configured to initiate a cleaning process responsive to the pressure sensor 110. The cleaning process may include expelling water and contaminants through a cleaning outlet 140 of the media filter vessel 102. The pressure sensor 110 may be operably connected to the monochromatic light source 160, optionally through the controller 170. The controller 170 may provide automated operation of the system. In some embodiments, certain modes of operation may be performed by manual operation. Such manual operation may be initiated through the controller 170 or through a manual operating switch 180.

In accordance with another aspect, there is provided a method of treating water for use in aquatics or recreational facilities. The methods disclosed herein may comprise fluidly connecting a media filter vessel to a source of water for use in aquatics or recreational facilities. For instance, methods may comprise installing an incoming connection from the aquatic or recreational facility to direct water to an inlet of the media filter vessel. Similarly, the methods may further comprise installing an outgoing connection from an outlet of the media filter vessel to the aquatic or recreational facility. Generally, the media filter vessel may receive water including contaminants from the source of the aquatic or recreational water and return water that has been filtered of the contaminants for further use as aquatic or recreational water. Making the fluid connection may include installing pipes, pumps, and valves as necessary to direct the aquatic or recreational water to or from the media filter vessel.

The methods disclosed herein may further include illuminating a media inside the media filter vessel with light in a first mode. The media may be illuminated to allow viewing of the media within the media filter vessel, for example, through a viewing window, as described above. In some embodiments, the media may be illuminated with white light. Thus, illuminating the media in the first mode may comprise illuminating the media with a luminosity sufficient to allow visibility into the media filter vessel, as previously described. In some embodiments, illuminating the media may comprise activating the monochromatic light source to illuminate the media by flipping a switch, pressing a button, changing a setting, activating an application, or any operating any other manual control to initiate illumination.

The methods disclosed herein may comprise, in a second mode, observing the monochromatic light source display the color indicator to alert the operator of the status of the media filter vessel. For instance, the methods may comprise observing the monochromatic light source display the first color indicator indicating clean operation of the media filter vessel and/or observing the monochromatic light source display the second color indicator indicating deteriorated operation of the media filter vessel. The methods may further comprise observing the monochromatic light source display the third or fourth color indicators, as described above.

Methods disclosed herein may comprise initiating a cleaning process of the media filter vessel upon observing the monochromatic light source display the second color indicator. The cleaning process may be initiated manually by an operator. For example, the method may include manually initiating the cleaning process. In some embodiments, the methods may further comprise initiating operation of the media filter after completion of the cleaning process, for example, upon observing the monochromatic light source display the first color indicator. In accordance with certain embodiments, the methods may include initiating operation of the media filter upon observing the fourth color indicator. Operation of the media filter may be initiated manually, for example, by an operator. The methods may further comprise observing the monochromatic light source display the first color indicator or third color indicator and allowing the media filter to continue operation or preparing the media filter for an upcoming cleaning process.

In some embodiments, the methods disclosed herein may comprise programming a controller to execute commands to at least one of operate the media filter, terminate operation of the media filter, initiate the cleaning process, terminate the cleaning process, and re-initiate operation of the media vessel after cleaning. The controller may be programmed to execute one or more of the commands on a timer. For example, the controller may be programmed to execute a command to initiate operation of the media filter at a predetermined time or to execute a command to terminate operation of the media filter at a predetermined time. In an exemplary embodiment, the controller may be programmed to execute a command to initiate operation of the media filter in the morning and execute a command to terminate operation of the media filter in the evening. The controller may be programmed to execute one or more of the commands responsive to a differential pressure measurement obtained from the pressure sensor, as previously described.

Figure 2:
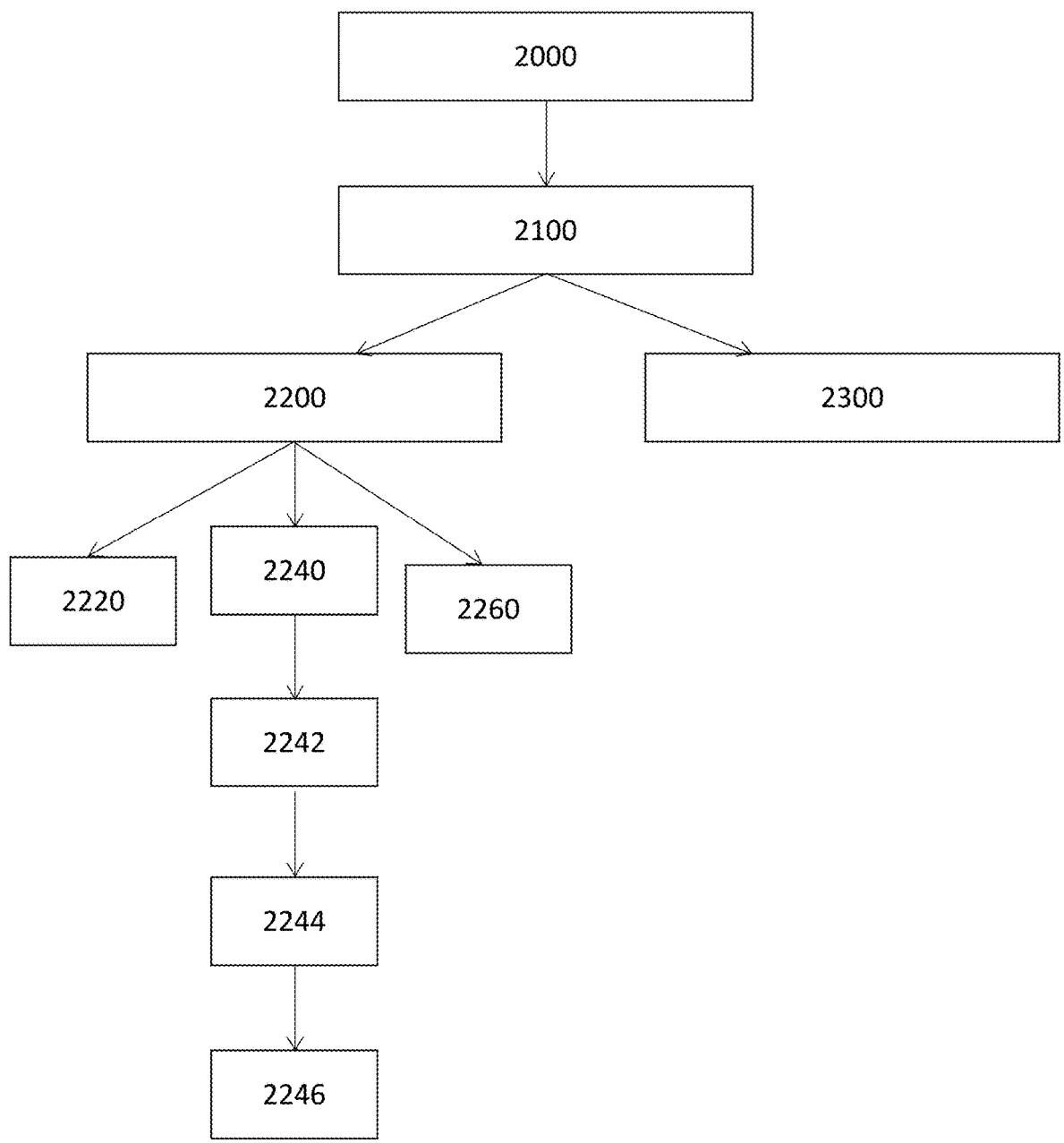
FIG. 2 is a flow chart of a method for treatment of water for use in aquatics and recreational facilities, according to one embodiment.

FIG. 2 is a flow diagram of an exemplary method of treating water for use in aquatics or recreational facilities. The method may comprise fluidly connecting a media filter vessel to a source of water for use in aquatics or recreational facilities (act 2000). In some embodiments, the method may comprise installing components on the media filter vessel or connecting the media filter vessel to a source of water for use in aquatics or recreational facilities, as described below in more detail. The method may comprise operating the media filter vessel (act 2100). During use, the method may comprise operating the monochromatic light source in a first mode of operation (act 2300) or in a second mode of operation (act 2200). The first mode of operation (act 2300) may comprise illuminating the media filter vessel to view the media within the media filter vessel. The second mode of operation (act 2200) may comprise observing the monochromatic light source display a first color indicator corresponding to clean operation (act 2220), observing the monochromatic light source display a second color indicator corresponding to deteriorated operation (act 2240), or observing the monochromatic light source display a third color indicator corresponding to deteriorating operation (act 2260). Upon observing the monochromatic light source display the first color indicator (act 2220) or the third color indicator (act 2260) the operator may allow the media filter vessel to continue in operation. Upon observing the monochromatic light source display the second color indicator (act 2240) the method may comprise initiating a cleaning process of the media filter vessel (act 2242), observing a fourth color indicator indicating that the cleaning process is complete (act 2244) and terminating the cleaning process or initiating clean operation of the media filter vessel (act 2246).

In accordance with yet another aspect, there is provided a method of retrofitting a media filter vessel to operate as described herein. The method may comprise providing a media filter vessel fluidly connectable to a source of water for use in aquatics or recreational facilities. The method may include fluidly connecting the media filter vessel to the source of water for use in aquatics or recreational facilities, for example, by installing or connecting one or more of pipes, pumps, and valves to provide fluid connection, as previously described herein.

Methods disclosed herein may include installing a pressure sensor on the media filter vessel. The pressure sensor may be installed such that it is configured to measure the differential pressure of a liquid across the media filter vessel. For example, the pressure sensor may be installed such that it is configured to measure differential pressure between a liquid inlet and a liquid outlet of the media filter vessel.

The methods disclosed herein may further comprise installing a monochromatic light source in the media filter vessel. The monochromatic light source may be electrically connected to a power supply. The monochromatic light source may be positioned or installed to allow visibility into the media filter vessel, as described herein. In some embodiments, installing the monochromatic light source may comprise installing a monochromatic light source having a luminosity sufficient to allow visibility into the media filter vessel, as previously described. For example, installing the monochromatic light source may comprise installing an LED. The methods may further comprise operably connecting the monochromatic light source to a manual control such that an operator can manually control illumination within the media filter vessel. For example, the monochromatic light source may be installed such that it is configured to illuminate a media inside the media filter vessel responsive to operation of the manual control.

The methods may include installing a monochromatic light source configured to inform an operator of the status of the media filter vessel. The methods may include operably connecting the monochromatic light source to the pressure sensor. Operably connecting the monochromatic light source to the pressure sensor may include programming the monochromatic light source to display a predetermined color indicator responsive to the pressure differential measured by the pressure sensor, as previously described herein.

In some embodiments, the method may comprise installing a monochromatic light source configured to perform more than one operation, as previously described herein. For example, the monochromatic light source may be configured to illuminate the media responsive to the manual control in a first mode of operation and display a color indicator in the second mode of operation.

In accordance with certain embodiments, the method may comprise installing the monochromatic light source on a pre-existing opening of the media filter vessel. The monochromatic light source may be installed to fit an existing connection, for example, a female national pipe thread (FNPT) connection. In an exemplary embodiment, the method may comprise installing the monochromatic light source on an air relief valve of the media filter vessel. The method may further comprise installing the monochromatic light source with an air tight seal, for example with an air tight cord. The monochromatic light source may be electrically connected to a power supply. Generally, the monochromatic light source may be installed such that electric power supply connection is insulated from liquid within the media filter vessel.

An exemplary media filter vessel may comprise a pressure sensor. The pressure sensor may include an influent pressure gauge and an effluent pressure gauge. The media filter vessel may have an inlet from the source of the aquatic or recreational water and an outlet to return filtered water back to the aquatic or recreational facility. A pump may pump water from the source of the aquatic or recreational water to the media filter vessel. The media filter vessel may further contain an outlet for expelling water and contaminants during the cleaning process, for example, during backwashing. The cleaning process outlet may comprise a valve. In some embodiments, for example, when an operator initiates the cleaning process, the valve may be manually controlled. In other embodiments, for example, when the cleaning process is automatic, the valve may be controlled by a controller.

In some embodiments, the method may further comprise installing a controller. The controller may be installed on an exterior surface of the media filter vessel or the controller may be installed remotely. The method may comprise operably connecting the controller to the pressure sensor such that the controller may be configured to execute one or more commands responsive to the pressure sensor, as previously described. Operably connecting the controller may comprise programming the controller to execute the one or more commands responsive to the pressure sensor. The controller may further be programmed to execute one or more commands on a timer or responsive to manual control of an operator. The controller may be digitally connected to the pressure sensor. In some embodiments, the controller and pressure sensor may be wirelessly connected. The controller may further be electrically connected to a power supply.

The method may comprise installing the controller such that the controller may be configured to execute a command to initiate the cleaning process of the media filter vessel responsive to the pressure sensor measuring a predetermined pressure differential threshold, as previously described herein. The methods may comprise installing the controller to execute commands to one or more of operate the media filter, terminate operation of the media filter, initiate the cleaning process of the media filter vessel, terminate the cleaning process of the media filter vessel, or re-initiate operation of the media filter, as previously described. The method may further comprise installing a manual control to initiate or terminate any one or more of the media filter operations.

The phraseology and terminology used herein is for the purpose of description and should not be regarded as limiting. As used herein, the term "plurality" refers to two or more items or components. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to the claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Having thus described several aspects of at least one embodiment, it is to be appreciated various alterations, modifications, and improvements will readily occur to those skilled in the art. Any feature described in any embodiment may be included in or substituted for any feature of any other embodiment. Such alterations, modifications, and improvements are intended to be part of this disclosure, and are intended to be within the scope of the invention. Accordingly, the foregoing description and drawings are by way of example only.

Those skilled in the art should appreciate that the parameters and configurations described herein are exemplary and that actual parameters and/or configurations will depend on the specific application in which the disclosed methods and materials are used. Those skilled in the art should also recognize or be able to ascertain, using no more than routine experimentation, equivalents to the specific embodiments disclosed.

What is claimed is:

1. A method of retrofitting a media filter vessel, the method comprising
    installing a pressure sensor on the media filter vessel, the pressure sensor configured to measure a differential pressure across the media filter vessel;
    installing a monochromatic light source in the media filter vessel configured to operate in a first mode of operation or in a second mode of operation;
    operably connecting the monochromatic light source to a manual control such that, in the first mode of operation, the monochromatic light source is configured to illuminate a media inside the media filter vessel responsive to an operator initiating the first mode of operation of the monochromatic light source via the manual control; and
    operably connecting the monochromatic light source to the pressure sensor such that, in the second mode of operation, the monochromatic light source is configured to display a first color indicator responsive to the pressure sensor measuring the pressure differential within a first pressure differential range and the monochromatic light source is configured to display a second color indicator responsive to the pressure sensor measuring the pressure differential within a second pressure differential range.

2. The method of claim 1, wherein installing the monochromatic light source comprises installing a monochromatic light source having a luminosity sufficient to allow visibility into the media filter vessel when operating in the first mode.

3. The method of claim 2, wherein installing the monochromatic light source comprises installing a light-emitting diode.

4. The method of claim 1, comprising installing the monochromatic light source on an opening of the media filter vessel.

5. The method of claim 4, comprising installing the monochromatic light source on an air relief connection of the media filter vessel.

6. The method of claim 5, further comprising installing the monochromatic light source with an air tight seal.

7. The method of claim 1, further comprising installing a controller and operably connecting the controller to the pressure sensor such that the controller is configured to initiate a cleaning process of the media filter vessel responsive to the pressure sensor measuring the pressure differential within the second pressure differential range.

8. The method of claim 7, comprising installing the controller such that the controller is configured to initiate the cleaning process of the media filter vessel responsive to the pressure sensor measuring the pressure differential greater than 10 psi.

9. The method of claim 7, comprising installing the controller such that the controller is configured to terminate the cleaning process of the media filter vessel responsive to the pressure sensor measuring the pressure differential within the first pressure differential range.

10. The method of claim 9, comprising installing the controller such that the controller is configured to terminate the cleaning process of the media filter vessel responsive to the pressure sensor measuring the pressure differential less than 5 psi.

* * * * *